(12) United States Patent
Thompson

(10) Patent No.: US 6,273,836 B1
(45) Date of Patent: Aug. 14, 2001

(54) CHAIN SPROCKET WITH AXIAL STIFFENERS

(76) Inventor: Spencer J. Thompson, 3141 Neap Ct., Oxnard, CA (US) 93035-2430

( * ) Notice: Subject to any disclaimer, the term of this patent is extended or adjusted under 35 U.S.C. 154(b) by 0 days.

(21) Appl. No.: 09/502,976

(22) Filed: Feb. 11, 2000

(51) Int. Cl.$^7$ .................................................. F16H 55/30
(52) U.S. Cl. .................................................................. 474/160
(58) Field of Search ................................. 474/160, 161, 474/148, 152

(56) References Cited

U.S. PATENT DOCUMENTS

| | | |
|---|---|---|
| 4,009,621 | 3/1977 | Segawa . |
| 5,133,695 | 7/1992 | Kobayashi . |
| 5,242,028 | 9/1993 | Murphy et al. . |
| 5,791,203 | 8/1998 | Chen et al. . |

*Primary Examiner*—Dirk Wright
(74) *Attorney, Agent, or Firm*—Kelly Bauersfeld Lowry & Kelley, LLP

(57) ABSTRACT

A chain sprocket includes a disc-like base having an outer rim with teeth on an outer periphery thereof, a hub having a crank arm-accepting slot formed therein, and a plurality of spokes extending radially from the hub to the outer rim. Stiffening fins are formed integrally with at least some of the spokes. The stiffening fins extend axially from one side of the base, have a greatest axial dimension adjacent to the hub, and taper towards the outer rim to provide the sprocket with axial reinforcement.

20 Claims, 6 Drawing Sheets

CHAIN SPROCKET WITH AXIAL STIFFENERS

BACKGROUND OF THE INVENTION

The present invention relates to chain driven bicycles. More particularly, the present invention relates to a sprocket used on such bicycles which has stiffening fins to axially reinforce and strengthen the sprocket.

The majority of bicycles are chain driven in that the rider pushes downwardly with his or her feet on pedals placed at the ends of crank arms which are attached to a chain sprocket. The pedaling force rotates the typically circular or semi-circular sprocket. A chain interconnected between the teeth of the sprocket and a gear associated with the rear wheel of the bicycle is moved by the rotation of the sprocket, causing the rear wheel to rotate and propelling the bicycle forward.

In order to conserve the amount of materials used and to minimize the weight of the sprocket, it is typically constructed so as to be relatively thin. So long as only a moderate force is applied to the pedals, the sprockets in use today function adequately. However, when large forces are applied to the pedals, the sprocket tends to flex axially. This is oftentimes the case with bicycle moto-cross (BMX) or mountain bikes which are generally ridden off-road or under other strenuous conditions, such as dirt jumping and ramp riding. When applying great force to the pedals axial flexing or even permanent bending of the sprocket may occur. For example, if the rider is jumping or performing tricks or if the rider lands or crashes in such a way, sprocket bending may occur. This flexing or bending can cause chain disengagement from the sprocket and/or difficulty in shifting gears. Chain disengagement can result in valuable time lost in racing situations, and is also quite dangerous to the rider as control of the bicycle may be lost and the loose chain can become tangled with objects on and around the bicycle. In extreme cases, the rider is not able to continue to ride at all.

Therefore, what is needed is a chain sprocket which is reinforced and strengthened axially in order to prevent axial flexing. Further, there is a need for a reinforced chain sprocket which can be used in a variety of existing bicycles without modifying other components of the bicycle. The present invention fulfills these needs and provides other related advantages.

SUMMARY OF THE INVENTION

The present invention resides in a chain sprocket comprising a disc-like base including an outer rim having teeth on its outer periphery, a hub, and a plurality of spokes extending radially from the hub to the outer rim, and stiffening fins formed integrally with at least some of the spokes and extending axially from the spokes. The chain sprocket is typically used in a chain drive system interconnected between a rear wheel and a frame of a bicycle.

In a preferred embodiment, a crank arm-accepting slot is formed within the hub, and the base includes a crank arm supporting platform having an aperture therethrough. The supporting platform extends from the hub for the securement of a crank arm thereto.

The stiffening fins generally extend axially from one side of the base a distance in excess of the thickness of the outer periphery and preferably a distance approximately equivalent to the thickness of the crank arm. The fins have a greatest axial dimension adjacent to the hub and taper towards the outer rim. The hub also extends axially to match the adjacent portion of the stiffening fins.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 3:
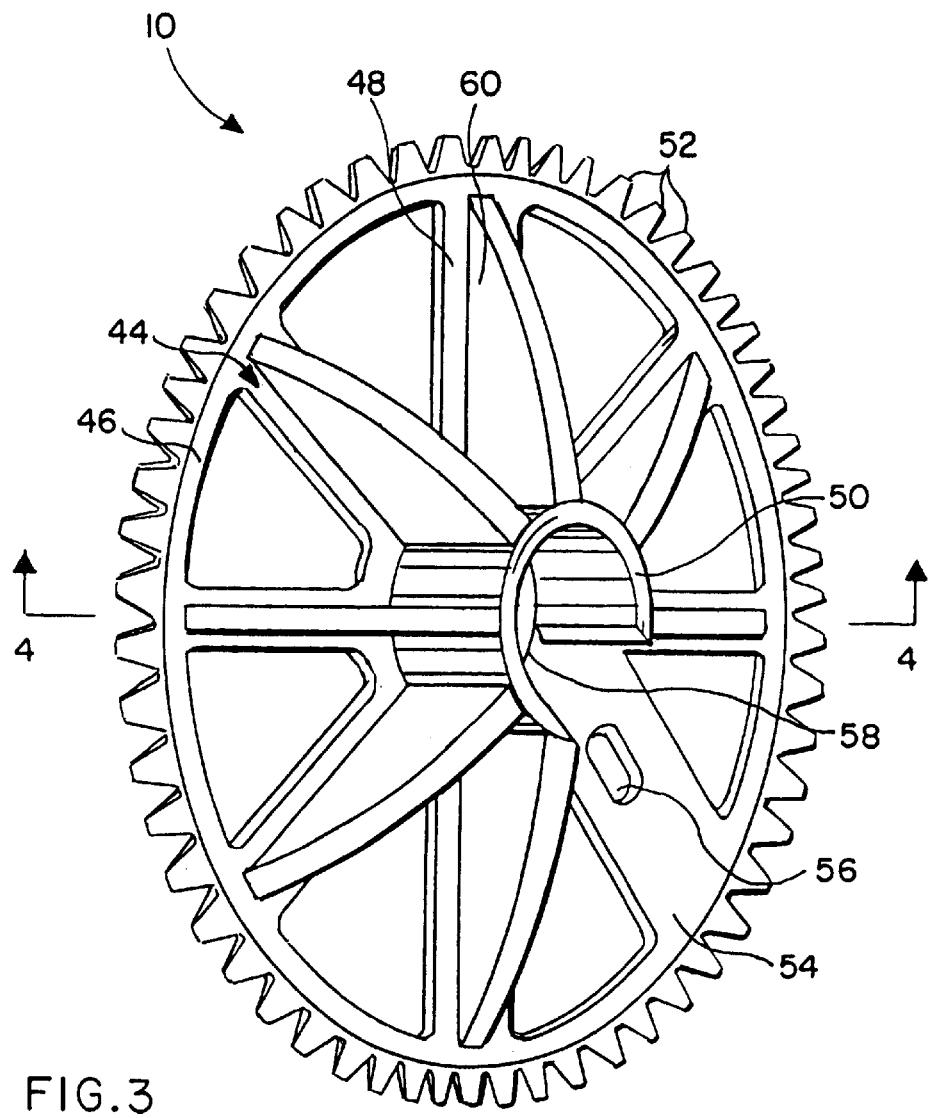
FIG. 3 is an enlarged perspective view of the chain sprocket shown in FIGS. 1 and 2.
Figure 4:
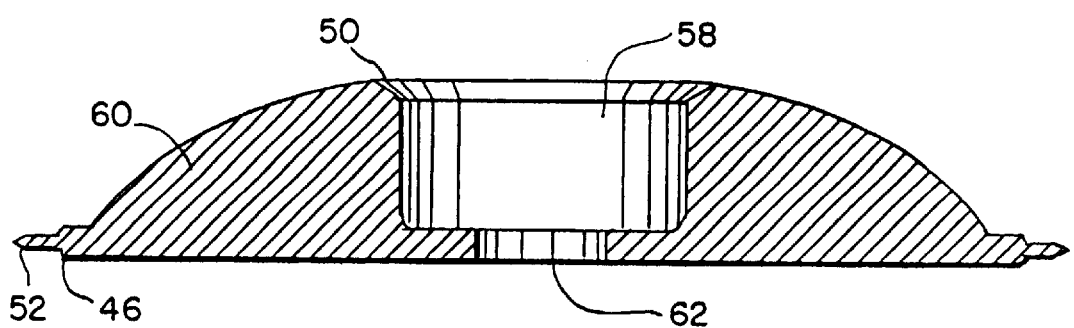
FIG. 4 is an enlarged cross-sectional view taken along line 4—4 of FIG. 3.
Figure 5:
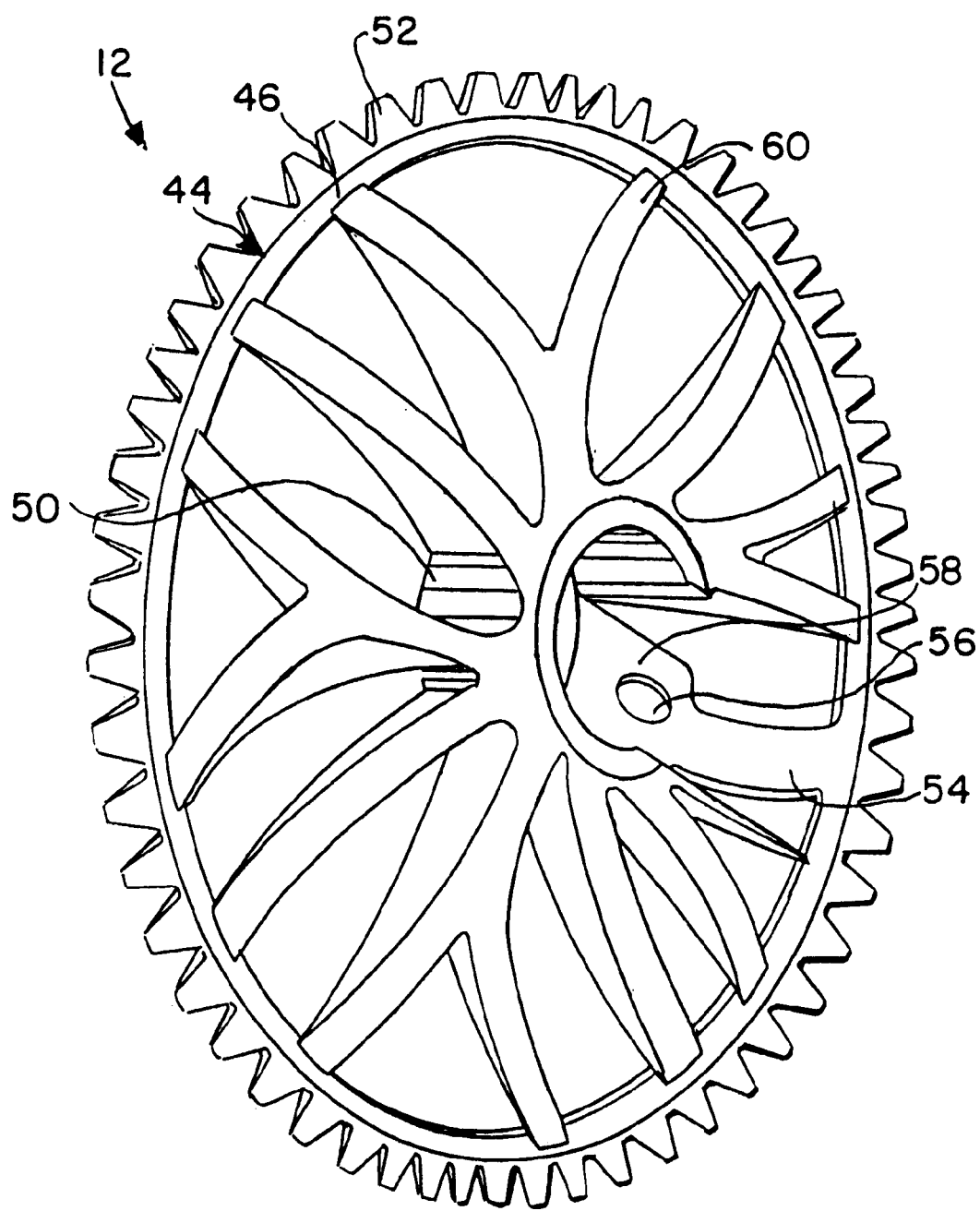
FIG. 5 is a perspective view of an alternative embodiment of a chain sprocket embodying the present invention.
Figure 6:
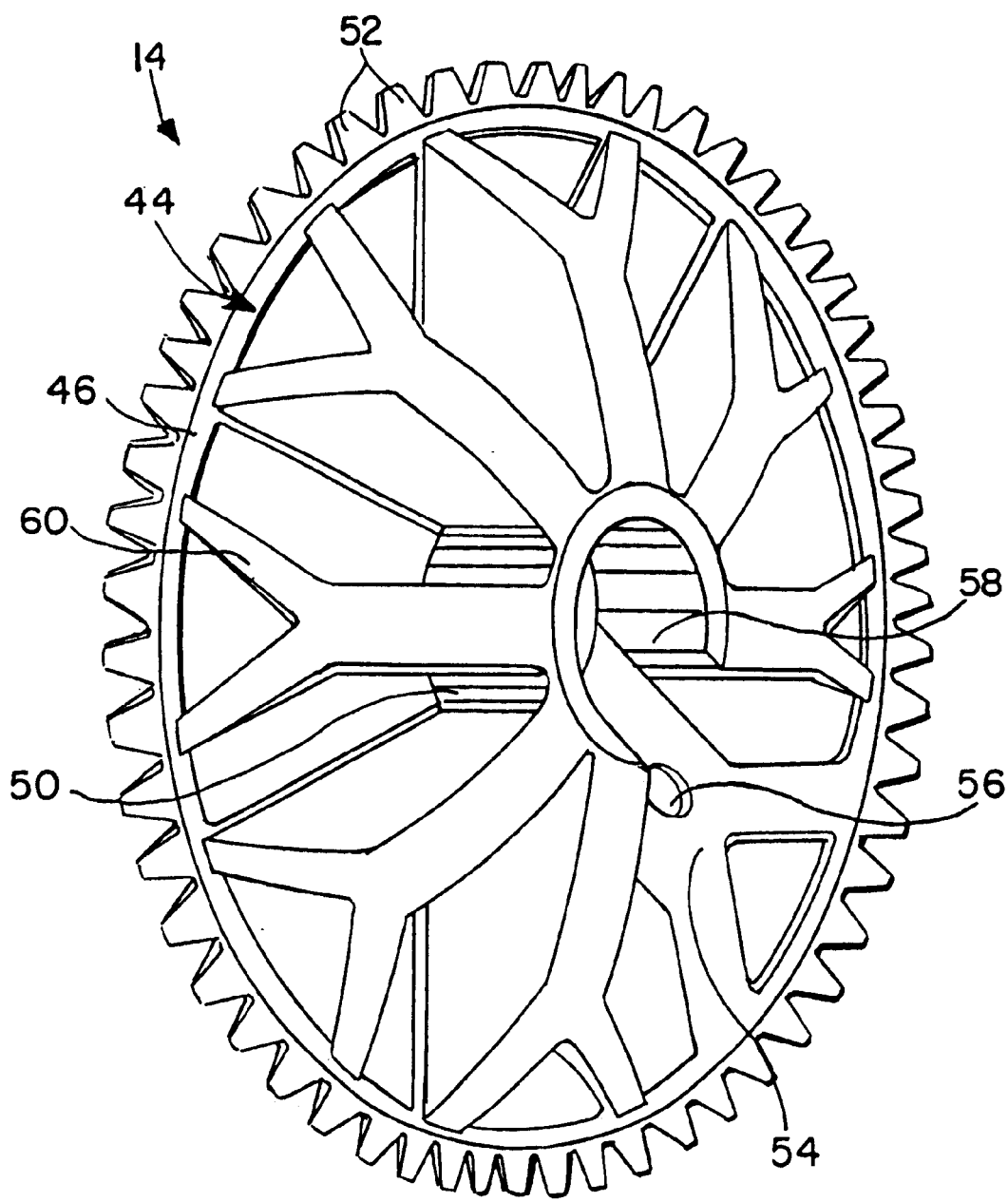
FIG. 6 is a perspective view of a third embodiment of a chain sprocket embodying the invention.
Figure 7:
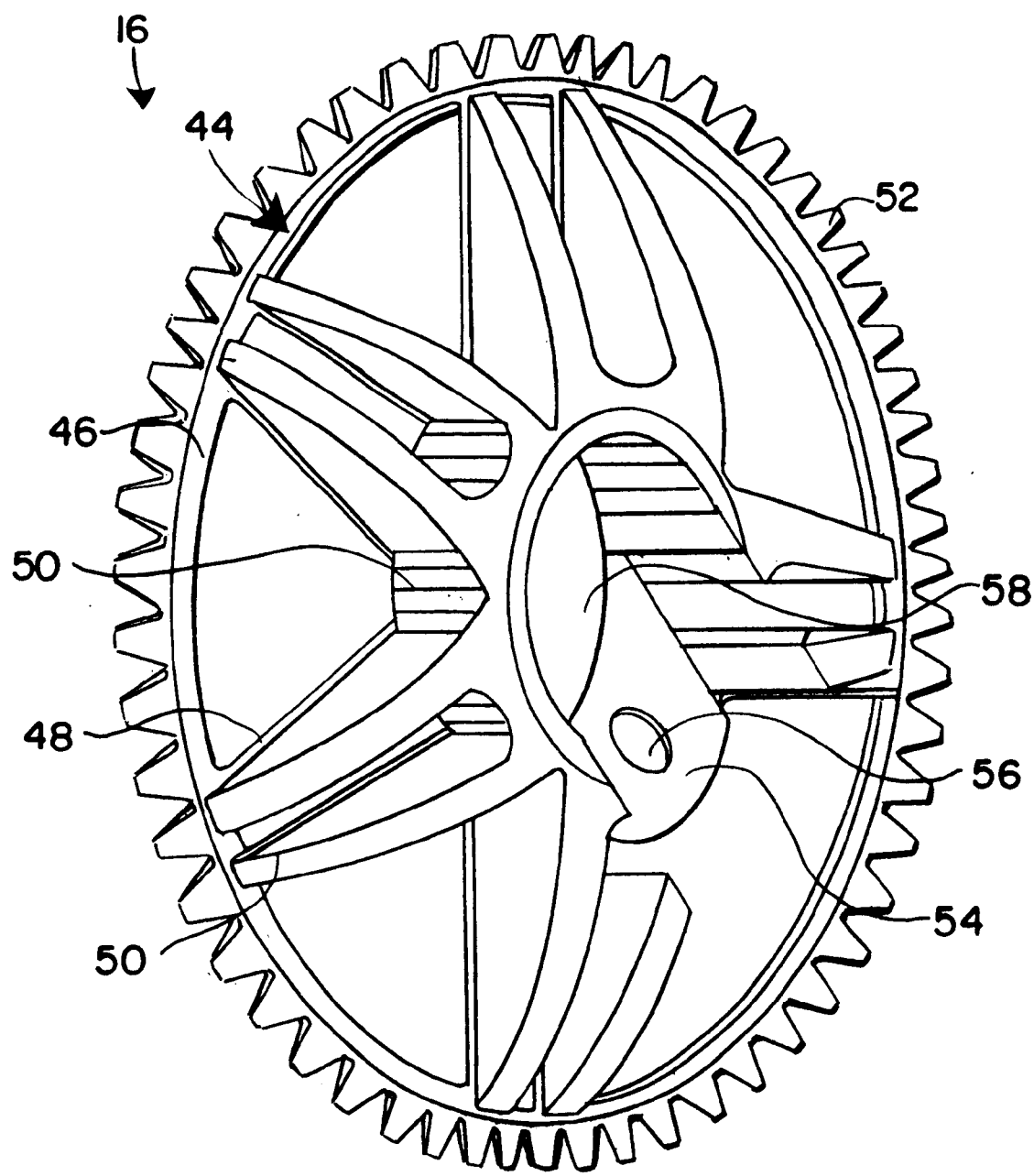
FIG. 7 is a perspective view of a fourth embodiment of a chain sprocket embodying the present invention.

As shown in the drawings for purposes of illustration, the present invention is concerned with a chain sprocket having axial stiffeners, generally referred to in FIGS. 1–4 by the reference number 10, in FIG. 5 by the reference number 12, in FIG. 6 by the reference number 14, and in FIG. 7 by the reference number 16. In the following description, functionally equivalent components of the various embodiments are referred to by the same reference number.

Figure 1:
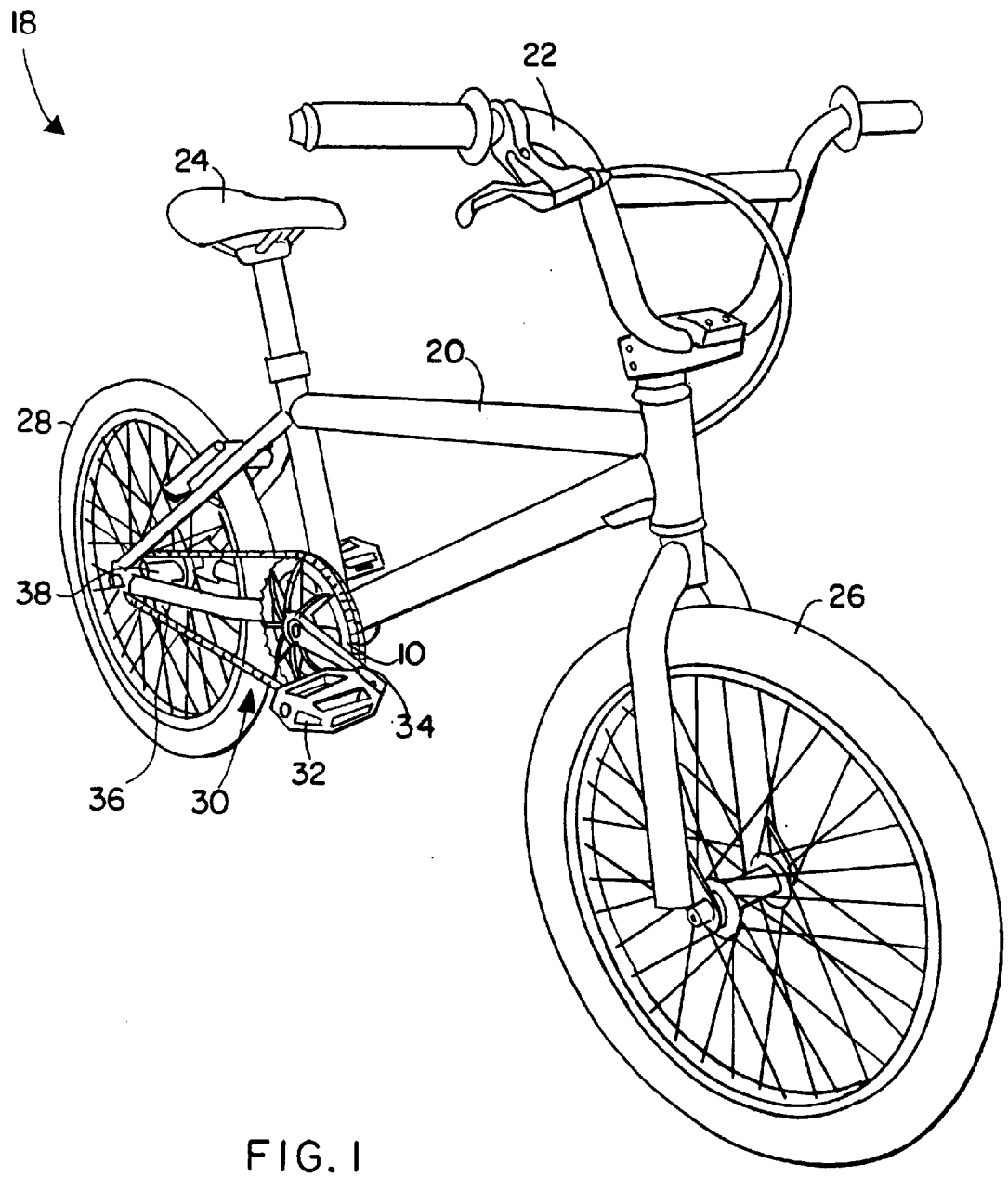
FIG. 1 is a perspective view of a BMX style bicycle incorporating a chain sprocket having axial stiffening fins and embodying the present invention.
Figure 2:
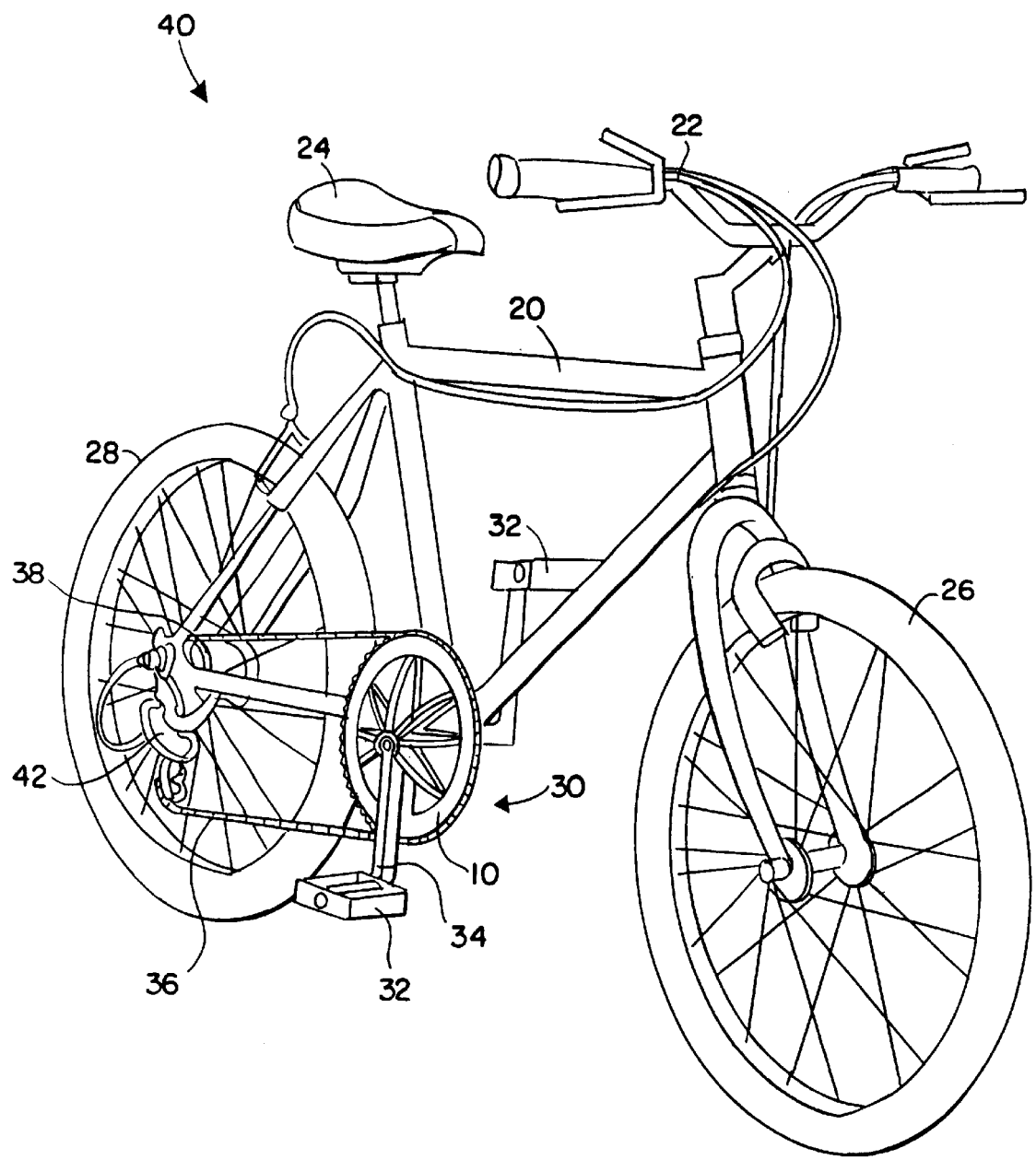
FIG. 2 is a perspective view of a mountain bike incorporating the same chain sprocket illustrated in FIG. 1.

Referring to FIGS. 1 and 2, the chain sprocket 10 may be used on bicycles having a chain drive system. A BMX style bike 18 is illustrated in FIG. 1. The bike 18 has a frame 20 to which is attached a handlebar 22, a seat 24, a front wheel 26, a rear wheel 28, and a chain drive system 30 interconnected between the frame 20 and a gear or sprocket associated with the rear wheel 28. Although BMX bikes may have gear systems, most use only a single crank or chain sprocket and rear wheel sprocket, and thus have only a single gear. The chain drive system 30 of the bike 18 as illustrated includes pedals 32 which are connected to of crank arms 34, which are, in turn, connected to the chain sprocket 10. A chain 36 is interconnected between the chain sprocket 10 of the frame 20 and a smaller sprocket 38 on the rear wheel 28.

As shown in FIG. 2, the sprocket 10 may be used on other bicycles, such as a mountain bike 40. The mountain bike 40 has many of the same general components as the BMX bike 18, except the mountain bike 40 is typically larger in size and includes a derailer system 42 attached to a plurality of chain sprockets on the frame 20 and a plurality of sprockets 38 associated with the rear wheel 28. One or more of the chain sprockets may be comprised of the chain sprocket 10 of the present invention. The derailer system 42 acts to move the chain 36 between the adjacent sprockets to provide a gear system for the bike 40. Although the chain sprockets 10–16 of the present invention are particularly useful on BMX 18 and mountain bikes 40, the sprockets 10–16 can also be incorporated into and used on a variety of other bicycles as well.

Referring to FIGS. 3 and 4, the chain sprocket 10 typically comprises a disc-like base 44 having an outer rim 46 and spokes 48 extending radially from a hub 50 to the outer rim 46. Chain-accepting teeth 52 are formed along the outer periphery of the outer rim 46. The base 44 may include a crank arm supporting platform 54 extending from the hub 50. The chain sprocket 10–16 can be designed so that the spokes 48 and hub 50 are removable from the outer rim 46, such as with bolts or the like. The crank arm supporting platform 54 may or may not fully extend to the outer rim 46. An aperture 56 is typically formed in the supporting platform 54 to facilitate the securement of a crank arm to the platform 54. A crank arm-accepting slot 58 is formed within the hub 50 for the acceptance of the end of the crank arm 34 opposite the pedal 32. The base 44 also includes an aperture 62 for attaching the sprocket 10 to an axle and bottom bracket component of the frame 20.

Stiffening fins 60 are formed integrally with at least some, and preferably most, of the spokes 48. The stiffening fins 60 extend axially from at least one side of the base 44 of the sprocket 10. The stiffening fins 60 can extend from both sides of the spokes 48 but preferably on a side opposite to the frame 20 so as not to interfere with the rotation of the sprocket 10 of currently designed bicycles.

The stiffening fins 60 have a greatest axial dimension near the hub 50 and taper towards the outer rim 46. It should be noted that the base 44 may only comprise the outer rim 46, spokes 48 and hub 50 formed within the spokes 48. The critical aspect of the present invention is the enhanced axial dimension of the stiffening fins 60 of the spokes 48, other structures are merely design choices for particular utility needs or aesthetic appeal. The stiffening fins 60 generally extend axially an approximate distance as the thickness of the crank arm 34. However, there is no limitation on the extension dimension as the stiffening fins 60 can extend either more or less than the thickness of the crank arm 34. The hub 50 preferably also extends axially to approximately match the axial dimension of the portion of the stiffening fins 60 adjacent the hub 50. As can be clearly seen in FIG. 4, the stiffening fins 60 have a much greater axial dimension than the teeth 52 or outer rim 46 of the base 44. Accordingly, the stiffening fins 60 act to reinforce the sprocket 10, preventing axial flexing of the sprocket 10 while in use.

As shown in FIGS. 5–7, the configuration and design of the radially extending spokes 48 and the integrally formed stiffening fins 60 can be altered. As is illustrated in FIGS. 5 and 6, the ends of the stiffening fins 60 can split off and branch out towards the outer rim 46. Alternatively, parallel sets of spokes 48 and stiffening fins 60 can be used as illustrated in FIG. 7. Other designs and configurations are possible. The effect of the varying configurations is to control the weight of the sprocket 10–16, vary axial reinforcement to the sprocket 10–16, and provide differing aesthetic qualities.

Although several embodiments have been described in detail for purposes of illustration, various modifications may be made to each without departing from the scope and spirit of the invention. Accordingly, the invention is not to be limited, except as by the appended claims.

What is claimed is:

1. A chain sprocket, comprising:
   a disc-like base including an outer rim having teeth on an outer periphery thereof, a hub, and a plurality of spokes extending radially from the hub to the outer rim; and
   stiffening fins formed integrally with at least some of the spokes, the stiffening fins extending axially from the respective spokes.

2. The sprocket of claim 1, including a crank arm-accepting slot formed within the hub.

3. The sprocket of claim 2, wherein the base includes a crank arm supporting platform extending from the hub.

4. The sprocket of claim 3, including an aperture through the crank arm supporting platform for the securement of a crank arm thereto.

5. The sprocket of claim 4, wherein at least a portion of the fins extends axially a distance approximately equivalent to the thickness of the crank arm.

6. The sprocket of claim 1, wherein the fins have a greatest axial dimension adjacent to the hub and taper towards the outer rim.

7. The sprocket of claim 6, wherein the hub extends axially to match the adjacent portion of the fins.

8. The sprocket of claim 1, wherein the stiffening fins all extend axially from one side of the base.

9. A bicycle, comprising:
   a frame;
   front and rear wheels attached to the frame; and
   a chain drive system interconnected between the frame and the rear wheel, the chain drive system including a chain sprocket comprising a disc-like base including an outer rim having teeth on an outer periphery thereof, a hub, and a plurality of spokes extending radially from the hub to the outer rim, and stiffening fins formed integrally with at least some of the spokes, the stiffening fins extending axially from the respective spokes.

10. The sprocket of claim 9, including a crank arm-accepting slot formed within the hub.

11. The sprocket of claim 10, wherein the base includes a crank arm supporting platform extending from the hub.

12. The sprocket of claim 11, including an aperture through the crank arm supporting platform for the securement of a crank arm thereto.

13. The sprocket of claim 12, wherein at least a portion of the fins extends axially a distance approximately equivalent to the thickness of the crank arm.

14. The sprocket of claim 9, wherein the fins have a greatest axial dimension adjacent to the hub and taper towards the outer rim.

15. The sprocket of claim 14, wherein the hub extends axially to match the adjacent portion of the fins.

16. The sprocket of claim 9, wherein the stiffening fins all extend axially from one side of the base.

17. A bicycle, comprising:
   a frame;
   front and rear wheels attached to the frame; and
   a chain drive system interconnected between the frame and the rear wheel, the chain drive system including a chain sprocket comprising a disc-like base including an outer rim having teeth on an outer periphery thereof, a hub having a crank arm-accepting slot formed therein, and a plurality of spokes extending radially from the hub to the outer rim, and stiffening fins formed integrally with at least some of the spokes, the stiffening fins extending axially from one side of the base, and having a greatest axial dimension adjacent to the hub and tapering towards the outer rim.

18. The sprocket of claim 17, wherein the base includes a crank arm supporting platform extending from the hub, the crank arm supporting platform having an aperture therethrough for the securement of a crank arm thereto.

19. The sprocket of claim 18, wherein at least a portion of the fins extends axially a distance equivalent to the thickness of the crank arm.

20. The sprocket of claim 17, wherein the hub extends axially to match the adjacent portion of the fins.

* * * * *